United States Patent [19]

Nishima et al.

[11] Patent Number: 5,343,348
[45] Date of Patent: Aug. 30, 1994

[54] ACTUATOR FOR DISPLACING A MAGNETIC HEAD

[75] Inventors: Ryo Nishima, Yokosuka; Hisao Kinjo, Yokohama; Yoshio Mizuno, Kamakura; Katsuyuki Shudo, Yokosuka; Shigeru Kawase, Tokyo, all of Japan

[73] Assignee: Victor Company of Japan, Ltd., Yokohama, Japan

[21] Appl. No.: 863,565

[22] Filed: Apr. 3, 1992

[30] Foreign Application Priority Data

| Apr. 3, 1991 | [JP] | Japan | 3-029925[U] |
| Jul. 6, 1991 | [JP] | Japan | 3-060674[U] |
| Aug. 31, 1991 | [JP] | Japan | 3-077586[U] |
| Nov. 19, 1991 | [JP] | Japan | 3-0102923[U] |

[51] Int. Cl.$^5$ .............................. G11B 5/592
[52] U.S. Cl. ................... 360/109; 360/107; 360/77.16
[58] Field of Search .............. 360/107, 109, 10.2, 360/10.3, 77.16, 77.17, 130.22, 130.24

[56] References Cited

U.S. PATENT DOCUMENTS

| 4,093,885 | 6/1978 | Brown | 310/331 |
| 4,151,569 | 4/1979 | Hathaway | 360/77 |
| 4,363,046 | 12/1982 | Saito | 360/107 |
| 4,695,907 | 9/1987 | Inaji et al. | 360/107 |
| 4,882,635 | 11/1989 | Sanai | 360/10.2 |
| 4,930,030 | 5/1990 | Yabu et al. | 360/107 |
| 4,970,611 | 11/1990 | Kodama et al. | 360/107 |
| 5,157,563 | 10/1992 | Nagasawa et al. | 360/77.16 |
| 5,182,683 | 1/1993 | Mitsuhashi | 360/77.16 |

FOREIGN PATENT DOCUMENTS

| 56-165927 | 12/1981 | Japan . |
| 58-18686 | 4/1983 | Japan . |
| 61-35609 | 8/1986 | Japan . |
| 62-172575 | 7/1987 | Japan . |
| 63-25821 | 2/1988 | Japan . |
| 63-173217 | 7/1988 | Japan . |
| 63-173219 | 7/1988 | Japan . |
| 2-156486 | 6/1990 | Japan . |
| 2-254934 | 9/1990 | Japan . |
| 3-173913 | 7/1991 | Japan . |
| 4-60915 | 2/1992 | Japan . |

Primary Examiner—Stuart S. Levy
Assistant Examiner—Paul J. Ditmyer
Attorney, Agent, or Firm—Lowe, Price, LeBlanc & Becker

[57] ABSTRACT

A magnetic head actuator for displacing a magnetic head on a rotary magnetic head drum in a magnetic recording and reproducing apparatus includes a hollow cylindrical yoke housing a permanent magnet and a central pole therein, providing a magnetic circuit having an air gap. A support shaft axially movably extends through the yoke and has opposite ends positioned outside of the yoke. A coil bobbin is attached to the end of the support shaft which is positioned outside of the open end of the yoke. The coil bobbin supports a coil which is axially movably positioned in the air gap. Two parallel resilient suspension support wings are mounted on the yoke and attached respectively to the opposite ends of the support shaft. A magnetic head holder supporting a magnetic head is mounted on the end of the support shaft near the bottom of the yoke. When the coil is energized, the coil bobbin and hence the support shaft are axially moved to displace the magnetic head to a desired track on a magnetic tape around the rotary magnetic head drum. Since the support shaft is supported by the parallel suspension support wings, the magnetic head is held in good contact with the magnetic tape and prevented from being tilted out of a desired azimuth with respect to the magnetic tape. The magnetic head which is positioned near the bottom of the yoke is free from leakage fluxes from the magnetic circuit.

18 Claims, 15 Drawing Sheets

ACTUATOR FOR DISPLACING A MAGNETIC HEAD

BACKGROUND OF THE INVENTION

1. Field of the Invention

The present invention relates to a magnetic head actuator, and more particularly to an electro-mechanical actuator for displacing a magnetic head on a rotary magnetic head drum assembly in a magnetic recording and reproducing apparatus such as a video tape recorder (VTR).

2. Description of the Prior Art

Some magnetic recording and reproducing apparatus, typically video tape recorders (VTR), employ a rotary magnetic head for recording and reproducing information signals on and from a magnetic tape. It is well known in the art that the image quality and functions of the existing VTRs have been greatly improved as a result of the great progress which the VTR technology has made so far. Efforts are now being made to develop a digital VTR for recording a digital video signal on a magnetic tape.

VTRs are generally used to record continuous images such as images of television broadcast programs and images represented by video signals that are produced by television cameras. Since magnetic tapes for use in VTRs have a large storage capacity, there is also an attempt to use a VTR as a mass storage device in a digital information processing system, for example.

According to other attempts, a VTR is used as an external auxiliary storage device for a computer, or as a device for successively recording computer graphics images after they have been processed and successively reproducing the recorded images as a moving image. In such applications, inasmuch as an information signal is to be recorded on a magnetic tape along one to several tracks, the VTR is required to record the information signal on the magnetic tape highly stably and reliably.

Various known processes are carried out in VTRs to record an information signal on a magnetic tape along a particular track or rewrite, i.e., record an information signal over, an existing information signal already recorded on a magnetic tape along a particular track. According to one process, a magnetic tape is rewound by pre-rolling until a rotary magnetic head is positioned ahead of a start-of-record position on the magnetic tape. Then, when an information signal is to be recorded, the magnetic tape is fed rapidly in the forward direction to move the start-of-record position on the magnetic tape past the rotary magnetic head at a certain speed, during which time the rotary magnetic head records the information signal along a certain number of tracks following the start-of-record position. According to another method, the angular position of a capstan motor is controlled by control pulses supplied thereto to stop a magnetic tape so that a rotary magnetic head faces a desired recording position on the magnetic tape, and then the rotary magnetic head records an information signal on the magnetic tape thus held at rest.

The former practice is relied upon in an assembly or insert recording mode in the editing function of the VTR. Since the magnetic tape is required to be repeatedly rewound and fed in the forward direction each time an information signal is to be recorded on the magnetic tape, a burden is imposed on the tape transport system and the magnetic tape itself, this practice is not suitable for frequent recording of information signals. The position of a track where an information signal is to be recorded is determined by the relative movement of the running magnetic tape and the rotary magnetic head. Consequently, it is difficult to position the track highly accurately with respect to the magnetic head. In addition, the intervals between recording cycles cannot be shortened because the prerolling of the magnetic tape is time-consuming.

The latter method is advantageous in that no tape rewinding is necessary, no large burden is imposed on the tape transport mechanism and the magnetic tape since an information signal is recorded while the magnetic tape is at rest, and the track where an information signal is to be recorded can be positioned highly accurately with respect to the magnetic head. However, tracks recorded on a magnetic tape by a rotary magnetic head while the magnetic tape is at rest are different in pattern from tracks recorded on a magnetic tape by a rotary magnetic head while the magnetic tape is running at a certain speed. Therefore, when the magnetic tape with information signals recorded thereon according to this method is to be played back while the magnetic tape is running, the tracks cannot accurately be followed by the rotary magnetic head. Furthermore, difficulty is experienced in recording, on the same magnetic tape, tracks while the magnetic tape is at rest, and tracks while the magnetic tape is running.

There have been developed different magnetic head actuators for controlling the position or path of rotary magnetic heads with respect to tracks on magnetic tapes. Known magnetic head actuators include an electrostrictive electro-mechanical magnetic head actuator as disclosed in Japanese patent publication No. 58-18686 and dynamic electro-mechanical magnetic head actuators as disclosed in Japanese laid-open patent publication Nos. 63-25821, 63-173217, and Japanese patent application No. 2-254934, for example.

The dynamic electro-mechanical magnetic head actuators are more advantageous than the electrostrictive electro-mechanical magnetic head actuators in that they can displace the magnetic head over a larger distance, do not require a high voltage for actuating the magnetic head, and can easily control the position or path of the magnetic head. However, the conventional dynamic electro-mechanical magnetic head actuators are also disadvantageous in that the magnetic head is actuated, it is displaced arcuately and cannot be maintained in good contact with the magnetic tape, and the magnetic head is subjected to leakage fluxes from the magnetic circuit of the magnetic head actuator, preventing information signals to be accurately recorded on and reproduced from the magnetic tape. The magnetic head actuators have leaf springs with magnetic heads supported thereon. Since the leaf springs tend to vibrate in many vibration modes, coil bobbins connected thereto also tend to move obliquely to the axis thereof. The magnetic heads, which are supported on the leaf springs in a cantilever fashion, are also liable to vibrate with the leaf springs, and hence to be tilted out of a desired azimuth with respect to the magnetic tape.

SUMMARY OF THE INVENTION

It is ab object of the present invention to provide a magnetic head actuator for displacing a magnetic head on a rotary magnetic head drum assembly in a magnetic recording and reproducing apparatus, the magnetic head actuator being capable of keeping a magnetic head in contact with a magnetic tape without being tilted while the magnetic head is being displaced, and also of protecting the magnetic head from leakage fluxes from the magnetic circuit of the magnetic head actuator.

According to the present invention, there is provided an actuator for displacing a magnetic head, comprising a hollow yoke having a closed end and an open end, magnetic means fixedly mounted in the hollow hoke for providing a magnetic circuit in combination with the hollow yoke, the magnetic circuit having an annular air gap, a support shaft axially movably extending through the hollow hoke and having opposite ends positioned outside of the closed and open ends, respectively, of the hollow yoke, a coil bobbin attached to the end of the support shaft which is positioned outside of the open end of the hollow yoke, the coil bobbin supporting a coil which is axially movably positioned in the air gap, a pair of parallel resilient suspension support wings mounted on the yoke and attached respectively to the opposite ends of the support shaft, and a magnetic head holder supporting a magnetic head thereon, the magnetic head holder being mounted on the end of the support shaft near the closed end of the hollow yoke.

Since the support shaft is supported by the parallel suspension support wings, the magnetic head is held in good contact with the magnetic tape and prevented from being tilted out of a desired azimuth with respect to the magnetic tape. The magnetic head which is positioned near the closed end of the hollow yoke is free from any leakage fluxes from the magnetic circuit.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
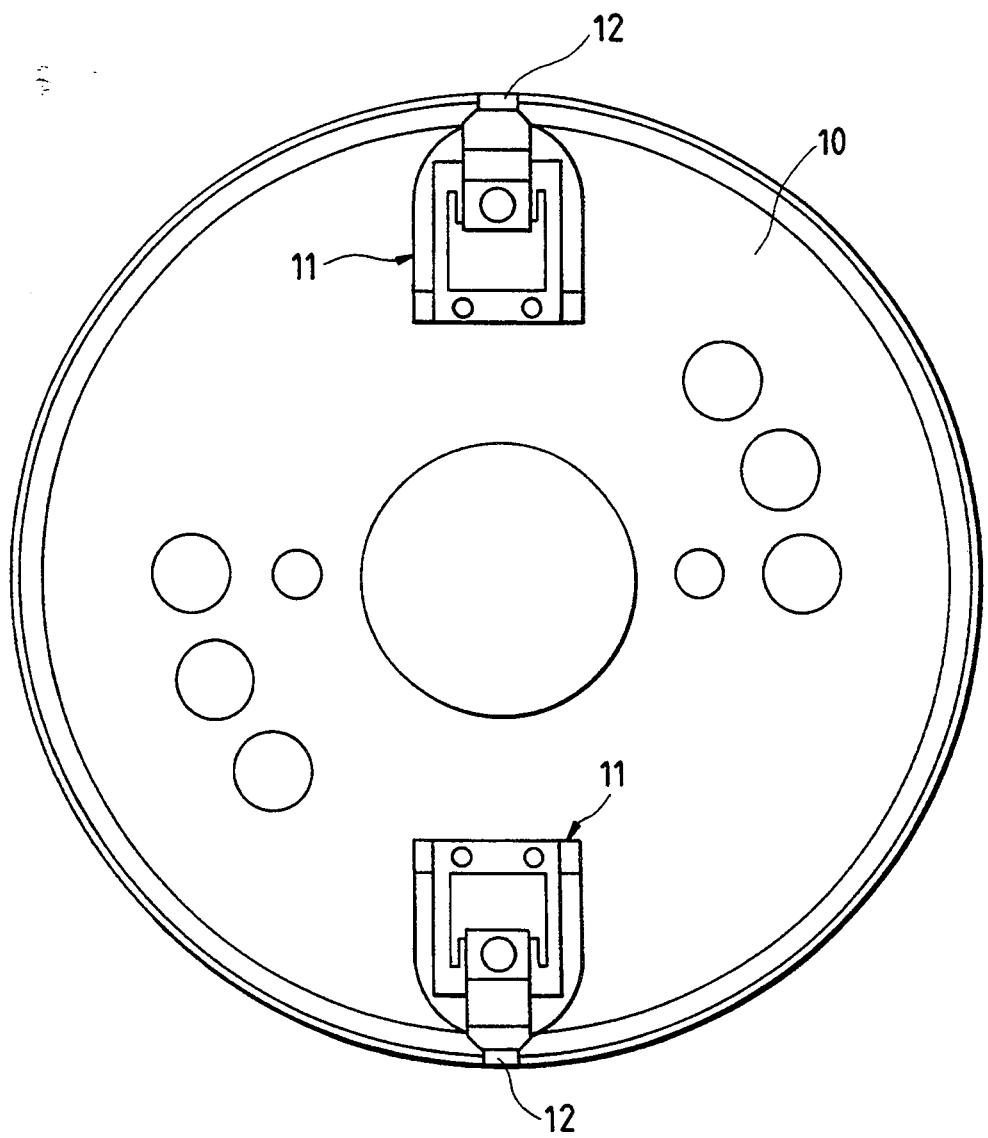
FIG. 1 is a plan view of a rotary head drum assembly incorporating a pair of magnetic head actuators according to the present invention.

Like or corresponding parts are denoted by like or corresponding reference numerals throughout views.

FIG. 1 shows a rotary magnetic head drum assembly for use in a magnetic recording and reproducing apparatus such as a video tape recorder. The rotary magnetic head drum assembly, denoted at 10, incorporates a pair of magnetic head actuators 11 according to the present invention which are positioned in diametrically opposite relationship to each other. The magnetic head actuators 11 support respective magnetic heads 12 on their outer ends at the outer circumferential surface of the rotary magnetic head drum assembly 10. A magnetic tape (not shown) is wrapped around the outer circumferential surface of the rotary magnetic head drum assembly 10. Desired information signals can be recorded on and reproduced from the magnetic tape by the magnetic heads 12 while the rotary magnetic head drum assembly 10 is rotating.

Figure 2:
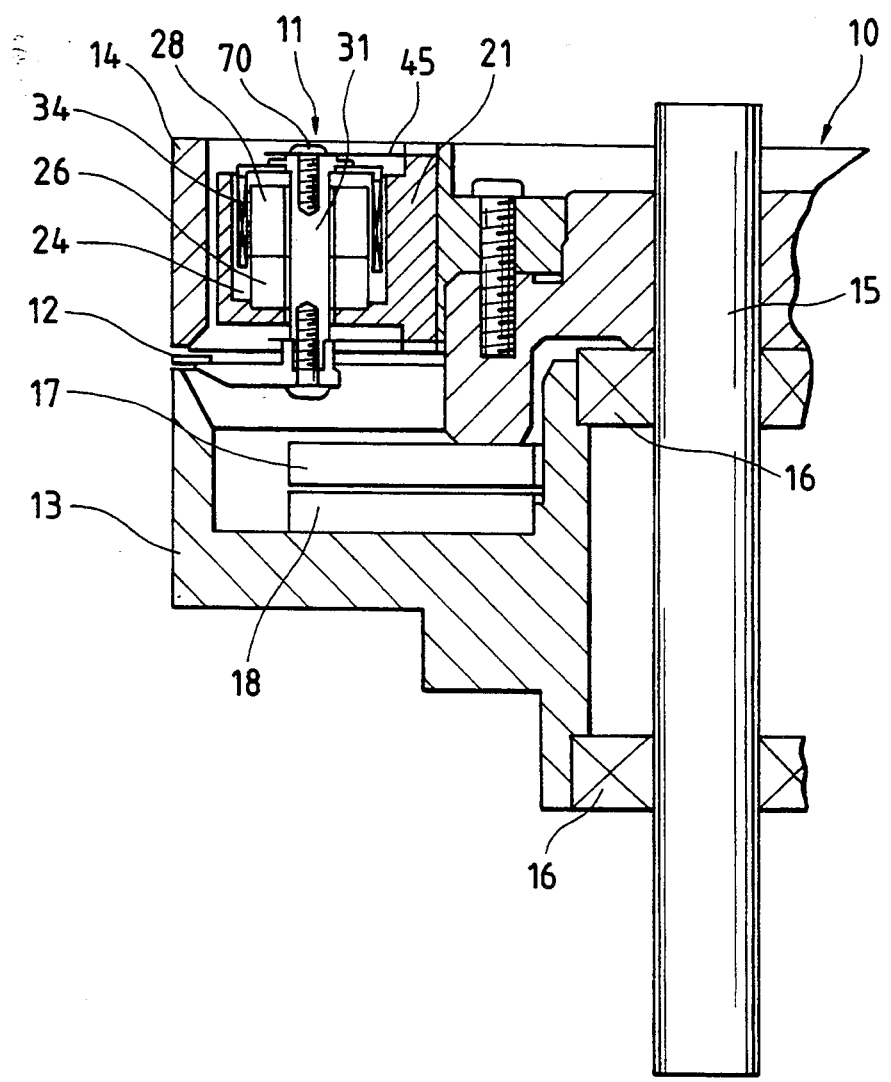
FIG. 2 is a fragmentary cross-sectional view of the rotary head drum assembly.

As shown in FIG. 2, the rotary magnetic head drum assembly 10 comprises a lower fixed drum 13, an upper rotatable drum 14 positioned upwardly of the lower fixed drum 13 and fixed to a rotatable shaft 15 that is rotatably supported on the lower fixed drum 13 by a pair of axially spaced bearings 16. The magnetic head actuator 11 (only one shown in FIG. 2) is supported on the upper rotatable drum 14. A rotary transformer having primary and secondary windings 17, 18 for transmitting signals to and from the magnetic head actuator 11 is disposed between the lower fixed drum 13 and the upper rotatable drum 14.

Figure 3:
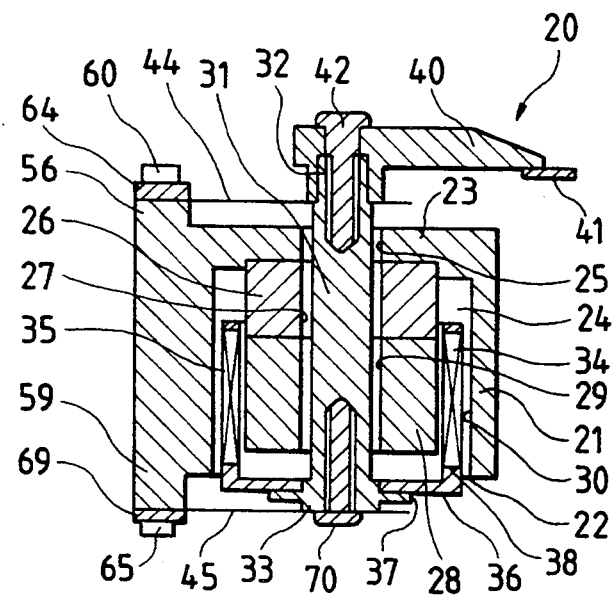
FIG. 3 is a cross-sectional view of a magnetic head actuator according to an embodiment of the present invention.
Figure 4:
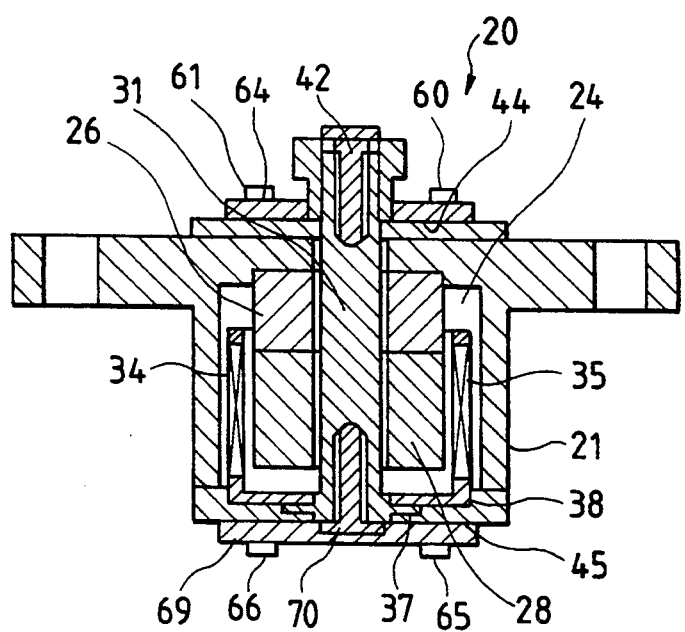
FIG. 4 is a cross-sectional view of the magnetic head actuator shown in FIG. 3.
Figure 5:
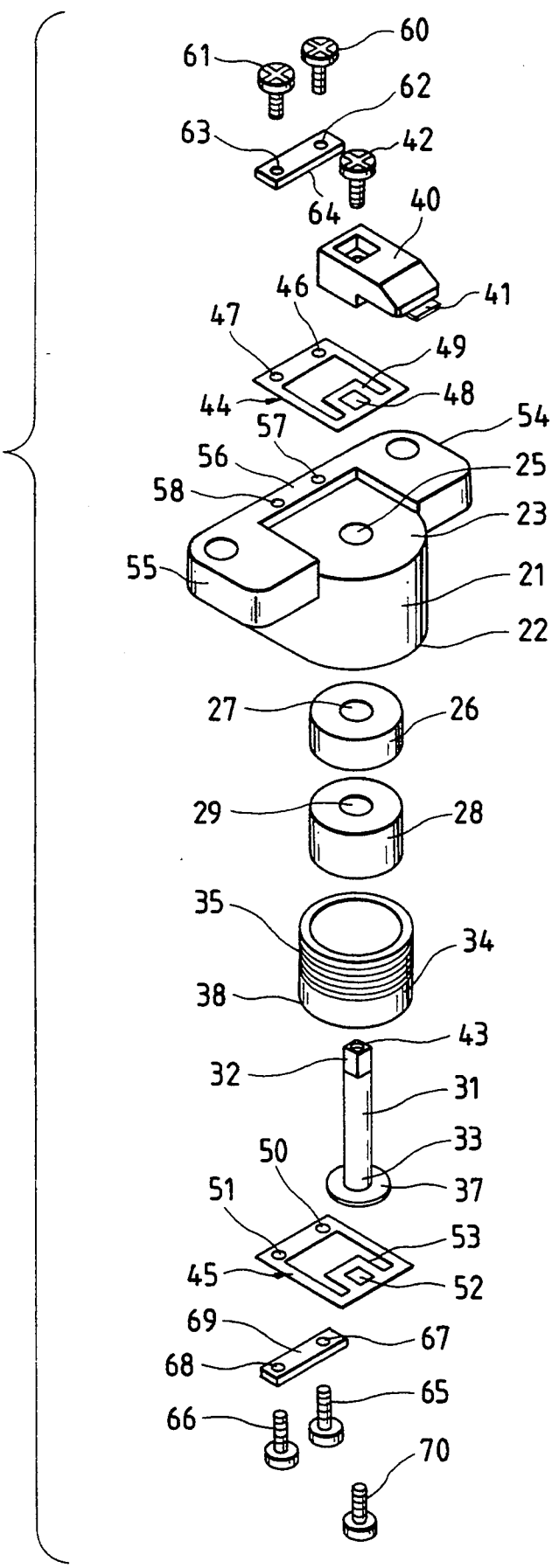
FIG. 5 is an exploded perspective view of the magnetic head actuator shown in FIGS. 3 and 4.

FIGS. 3, 4, and 5 show a magnetic head actuator 20, as each of the magnetic head actuator 11 shown in FIGS. 1 and 2, according to an embodiment of the present invention.

The magnetic head actuator 20 comprises a hollow, substantially cylindrical yoke 21 having an open axial end 22 and a closed axial end or bottom 23 opposite to the open axial end 22, and a hollow space 24 defined therein. The bottom 23 has a central hole 25 defined therein. The magnetic head actuator 20 also includes a tubular permanent magnet 26 having a central hole 27 defined axially therethrough and a tubular central pole 28 having a central hole 29 defined axially therethrough. The tubular permanent magnet 26 and the tubular central pole 28 are axially joined to each other and disposed within the space 24 in the yoke 21, with the central holes 25, 27, 29 being aligned with each other. The tubular permanent magnet 26 is fixed at an axial end thereof to the inner surface of the bottom 23 of the yoke 21. An annular air gap 30 is defined radially between the inner circumferential wall surface of the yoke 21 and the outer circumferential wall surfaces of the tubular permanent magnet 26 and the tubular central pole 28.

A support shaft 31 extends loosely through the central holes 25, 27, 29 and has opposite axial ends 32, 33 projecting out of the yoke 21, i.e., positioned outside of the ends 23, 22, respectively, of the yoke 21. The support shaft 31 supports thereon a coil bobbin 34 with a coil 35 wound thereon. Specifically, a circular flange 36 is mounted on the end 33 of the support shaft 31 and held against a flange 37 integral with the end 33 of the support shaft 31. The circular flange 36 has an outer circumferential edge bonded or otherwise secured to an axial end 38 of the coil bobbin 34. The coil 35 on the coil bobbin 34 which is supported on the support shaft 31 is positioned in the air gap 30.

A magnetic head holder 40, which supports a magnetic head 41 on a distal end thereof, is mounted, at its proximal end, on the end 32 of the support shaft 31 and fastened thereto by a bolt 42 that is threaded into an internally threaded hole 43 defined in the end 32 of the support shaft 31.

The ends 32, 33 of the support shaft 31 are connected to respective parallel suspension support wings 44, 45 which are fastened to the yoke 21. More specifically, the suspension support wings 44, 45 comprise thin resilient plates, respectively, that normally lie in planes perpendicular to the axis of the support shaft 31. As shown in FIG. 5, each of the suspension support wings 44, 45 has a punched-out rectangular shape. The suspension support wings 44, 45 are of high compliance, i.e., highly flexible in the direction parallel to the support shaft 31. The suspension support wing 44 has a pair of spaced holes 46, 47 defined in one end thereof and a recess 48 defined in a protrusion 49 on the other end thereof. Similarly, the suspension support wing 45 has a pair of spaced holes 50, 51 defined in one end thereof and a recess 52 defined in a protrusion 53 on the other end thereof.

The yoke 21 has a pair of arms 54, 55 joined to the bottom 23 thereof for attachment to the rotary magnetic head assembly, and a land 56 disposed on the bottom 23 and extending between the arms 54, 55. The raised region 56 has a pair of internally threaded holes 57, 58 defined therein. Likewise, the yoke also has a land 59 (see FIGS. 3 and 4) on the end 22 thereof which has a pair of internally threaded holes (not shown) defined therein.

The suspension support wing 44 is fastened to the land 56 by a pair of bolts 60, 61 extending through respective holes 62, 63 defined in a retainer plate 64 and also through the respective holes 46, 47, and threaded into the threaded holes 57, 58, respectively. With the suspension support wing 44 fastened in position, the end 32 of the support shaft 31 is fitted in the recess 48 of the suspension support wing 44, sandwiching the protrusion 49 between the support shaft 31 and the magnetic head holder 40. The magnetic head holder 40 is joined to the support shaft 31 after the suspension support wing 44 is connected to the yoke 21 as described above. Similarly, the suspension support wing 45 is fastened to the land 59 by a pair of bolts 65, 66 extending through respective holes 67, 68 defined in a retainer plate 69 and also through the respective holes 50, 51, and threaded into the threaded holes, respectively, in the land 59. The suspension support wing 45 is also fastened to the end 33 of the support shaft 31 by a bolt 70 that extends through the recess 52 threadedly into the end 33 of the support shaft 31.

Figure 6:
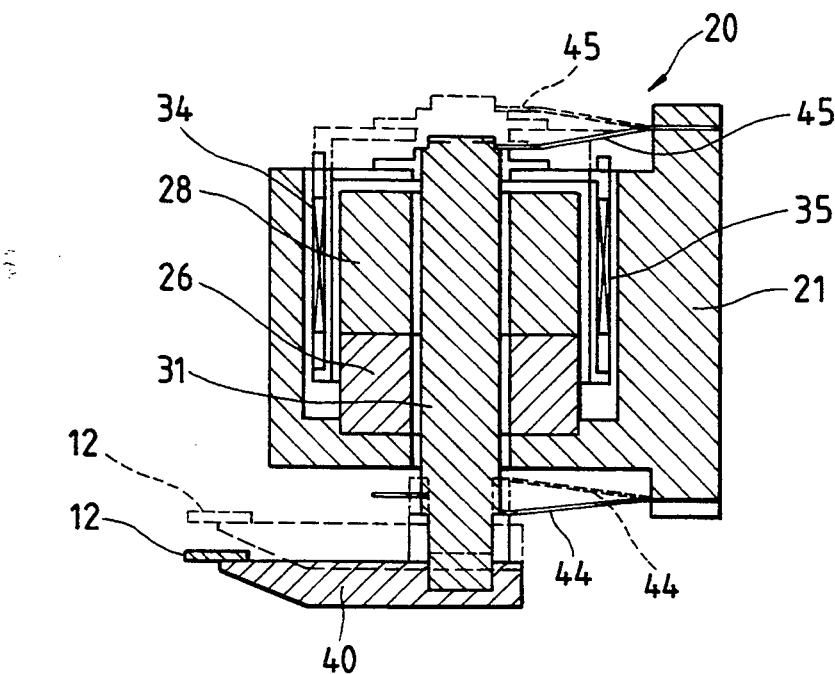
FIG. 6 is a cross-sectional view showing the manner in which the magnetic head actuator shown in FIGS. 3 and 4 operates.

When the coil 35 on the coil bobbin 34 is energized by an electric current supplied from a power supply (not shown), the coil bobbin 34 is axially moved in the air gap 30 across magnetic fluxes flowing through a magnetic circuit composed of the yoke 21, the permanent magnet 26, and the central pole 28. Since the support shaft 31 is supported at its opposite ends 32, 33 by the resilient parallel suspension support wings 44, 45 attached to the yoke 21, the support shaft 31 and hence the magnetic head 12 supported thereon are displaced essentially linearly, i.e., translated, between dotted- and solid-line positions in FIG. 6. Consequently, the magnetic head 41 is kept in good contact with the magnetic tape when the magnetic head 12 is thus actuated by the magnetic head actuator 20. Because the magnetic head 12 is also not unduly tilted out of a desired azimuth with respect to the magnetic tape, the magnetic head 12 can record and reproduce information signals on and from the magnetic tape along desired tracks thereon.

As shown in FIG. 2, the magnetic head 12 on the magnetic head actuator 11 that is mounted on the rotary magnetic head assembly 10 is positioned remotely from the region where any leakage flux is produced by the magnetic circuit. That is, the magnetic head 12 is located remotely from the air gap 30 around which any leakage flux is most likely to occur, i.e., the air gap 30 opens away from the magnetic head 12. Therefore, the magnetic head 12 is prevented from being adversely affected by any leakage flux that is produced by the magnetic head actuator.

The coil bobbin 34 is supported at its end 38 on the support shaft 31 by the flange 36, with the opposite axis end of the coil bobbin 34 being free. Even if the coil bobbin 34 is axially expanded due to the heat from the coil 35, therefore, only the free end of the coil bobbin 34 is axially displaced by such axial expansion of the coil bobbin 34. Accordingly, the position of the magnetic head 41 is not adversely affected by the expansion of the coil bobbin 34.

Figure 7:
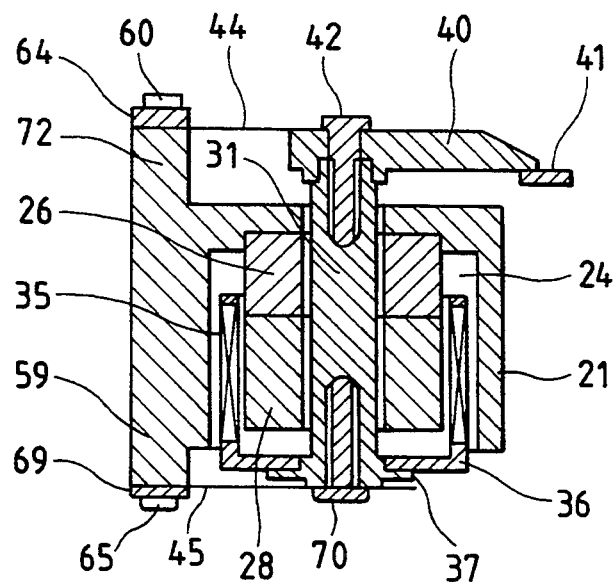
FIG. 7 and 8 are cross-sectional views of a modified magnetic head actuator.
Figure 8:
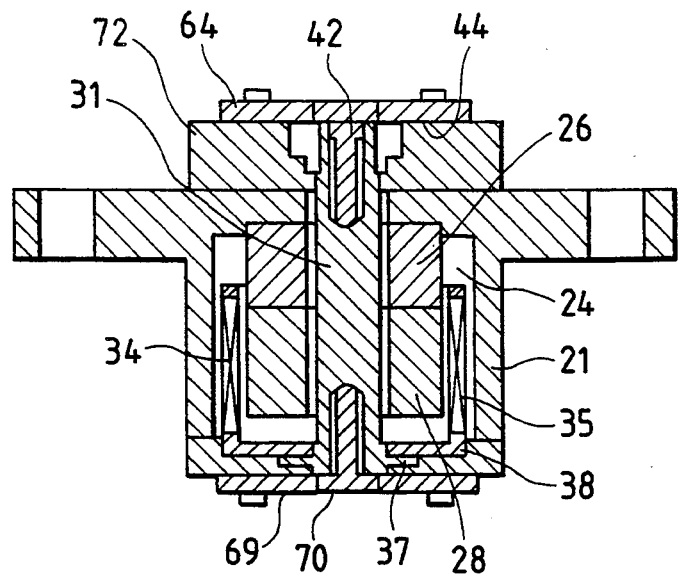

FIGS. 7 and 8 show a modified magnetic head actuator according to the present invention. According to the modification shown in FIGS. 7 and 8, the yoke 21 has a higher land 72 on the bottom 23 thereof, and the suspension support wing 44 mounted on the land 76 has its protrusion 49 (see FIG. 5) attached to the magnetic head holder 40, rather than the support shaft 31, by the bolt 42. Therefore, the suspension support wing 44 is joined to the magnetic head holder 40 after the magnetic head holder 40 is fastened to the support shaft 31. The suspension support wings 44, 45 are thus attached to respective opposite ends of a movable mechanism which is composed of the support shaft 31, the magnetic head holder 40, the bolt 42, the coil bobbin 34 with the coil 35, the flange 36, and the bolt 70.

Figure 9:
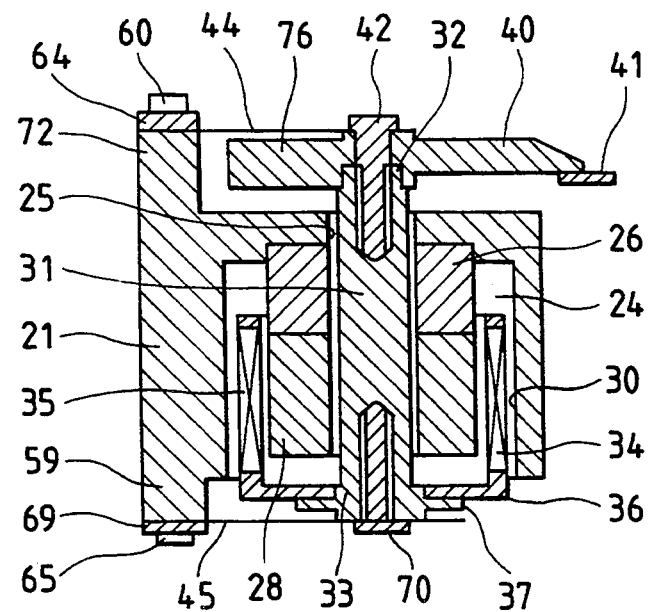
FIG. 9 is a cross-sectional view of another modified magnetic head actuator.

FIG. 9 illustrates another modified magnetic head actuator according to the present invention. The magnetic head actuator shown in FIG. 9 differs from the magnetic head actuator shown in FIGS. 7 and 8 in that a magnetic head holder 74 includes a portion 75 disposed on one side of the support shaft 31 and supporting the magnetic head 41, and a portion 76 disposed on the opposite side of the support shaft 31 and extending beneath the suspension support wing 44. The portions 75, 76 are of substantially the same weight. The weights of the various components of the movable mechanism are selected such that the movable mechanism has a center of gravity positioned on the support shaft 31 substantially intermediate between the suspension support wings 44, 45. With the center of gravity of the movable mechanism being thus positioned, even when the movable mechanism is vibrated by disturbances or the suspension support wings 44, 45 are elastically deformed in undesirable vibration modes thereof, the magnetic head 41 is tilted only through a relatively small angle. Therefore, the movable mechanism is not angularly displaced unstably.

Figure 10:
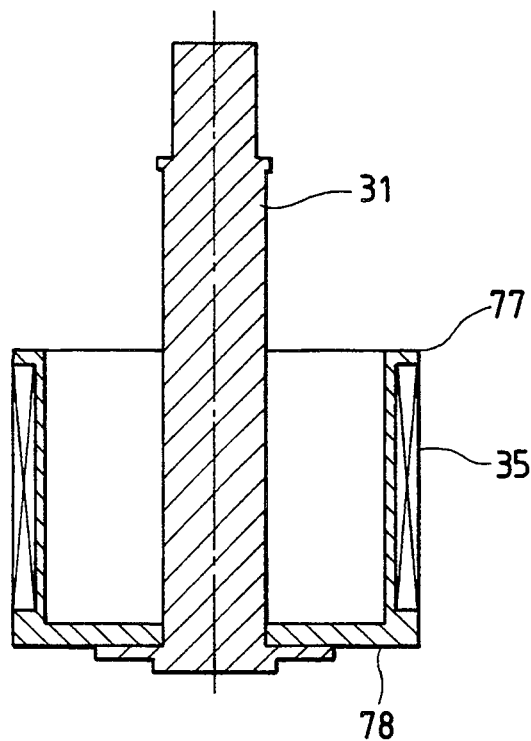
FIG. 10 is a cross-sectional view of a modified assembly of a support shaft and a coil bobbin.

FIG. 10 shows a modified assembly of a support shaft and a coil bobbin. According to the modification shown in FIG. 10, a coil bobbin 77 and a flange 78 are integral with each other, and the flange 78 is mounted on the support shaft 31. In the case where the coil bobbin 77 is made of metal, the flange 78 is also made of metal. Consequently, the heat produced by the coil 35 can be easily transferred from the coil bobbin 77 through the flange 78 to the support shaft 31, thus preventing the coil 35 from being overheated.

Figure 11:
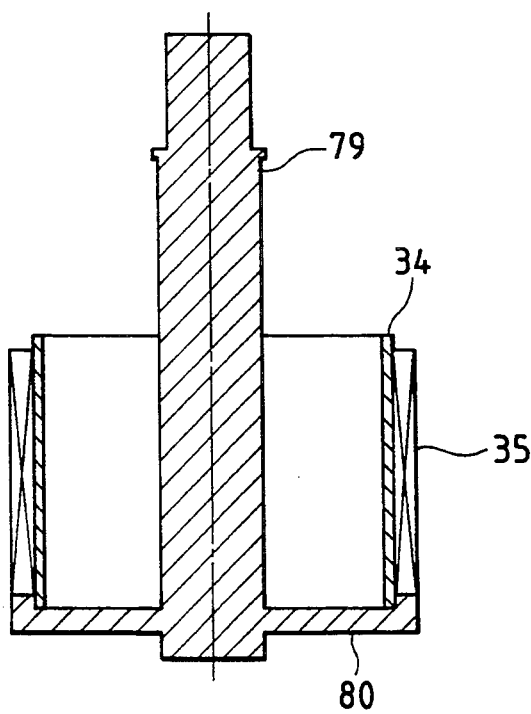
FIG. 11 is a cross-sectional view of another modified assembly of a support shaft and a coil bobbin.

In another modification shown in FIG. 11, a support shaft 79 and a flange 80 are integral with each other, and the coil bobbin 34 is fixed to the flange 80. In the case where the coil bobbin 34 and the flange 80 are made of metal, the heat produced by the coil 35 can also be easily transferred from the coil bobbin 34 through the flange 80 to the support shaft 31. On the other hand, if the coil bobbin 34 is made of synthetic resin, then the efficiency of the magnetic head actuator is now lowered by an eddy current which would otherwise be generated in a coil bobbin of metal, no short-circuit occurs between the coil 35 and the coil bobbin 34, and the coil bobbin 34 is lighter than a coil bobbin of metal.

Figure 12:
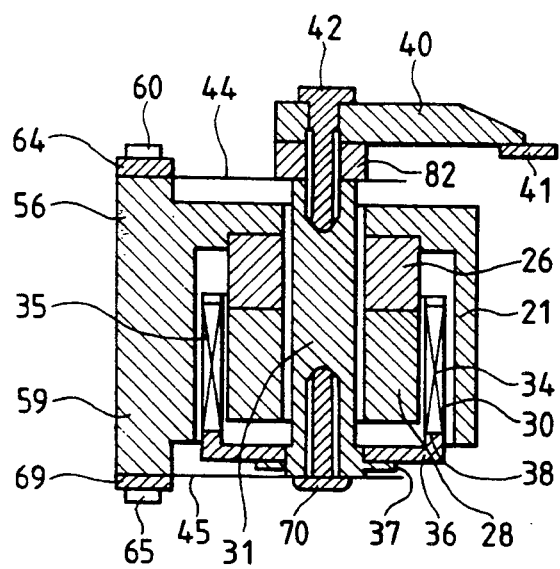
FIG. 12 is a cross-sectional view of a magnetic head actuator according to another embodiment of the present invention.
Figure 13:
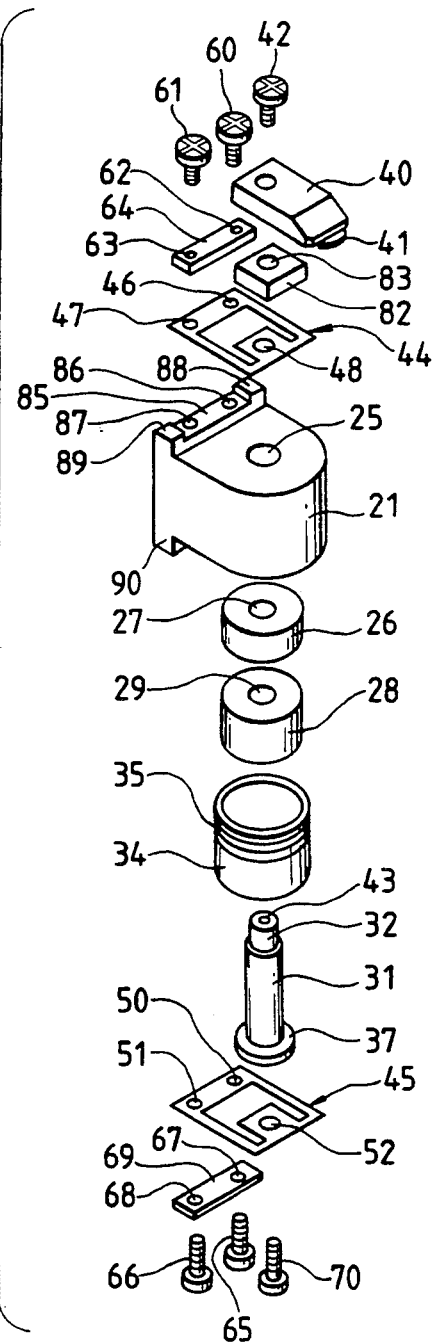
FIG. 13 is an exploded perspective view of the magnetic head actuator shown in FIG. 12.
Figure 14:
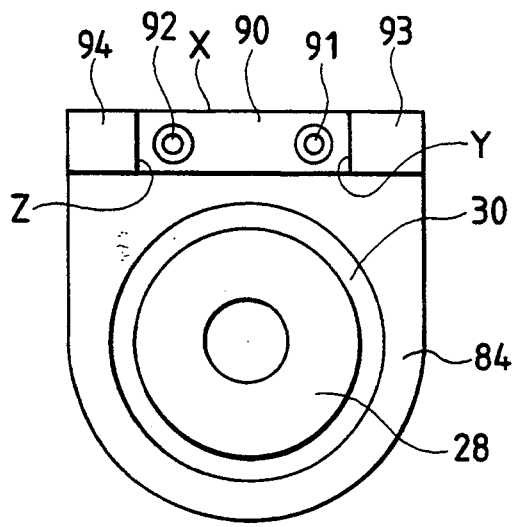
FIG. 14 is a plan view of a yoke of the magnetic head actuator shown in FIG. 12.
Figure 15:
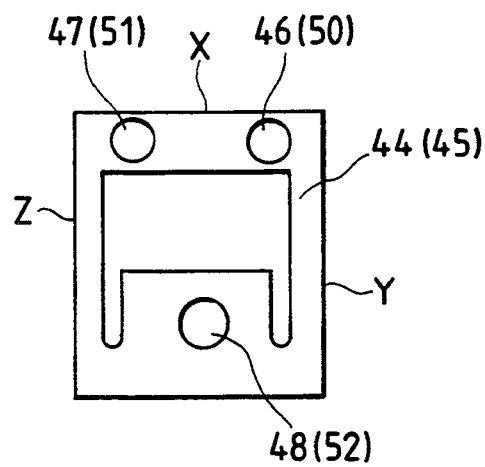
FIG. 15 is a plan view of a suspension support wing of the magnetic head actuator shown in FIG. 12.
Figure 16:
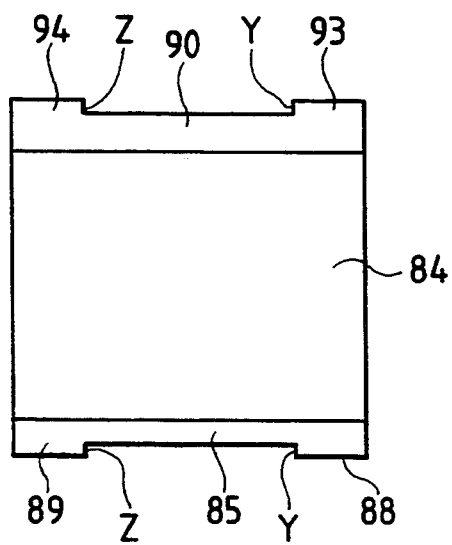
FIG. 16 is a front elevational view of the yoke shown in FIG. 14.
Figure 17:
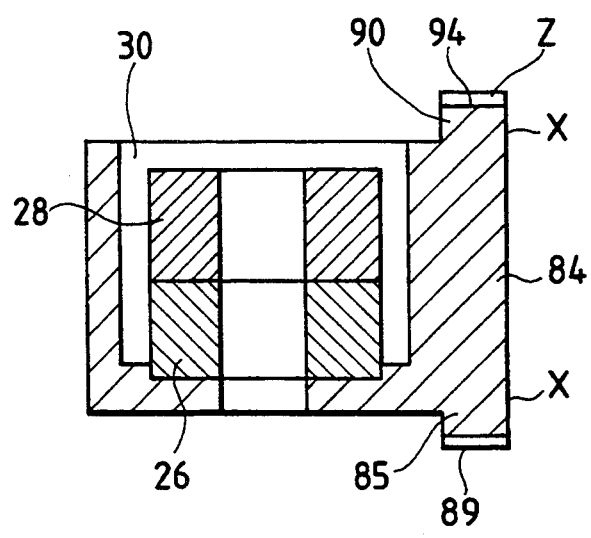
FIG. 17 is a cross-sectional view of the yoke shown in FIG. 14.

FIGS. 12 through 17 show a magnetic head actuator according to another embodiment of the present invention. As shown in FIGS. 12 and 13, the magnetic head actuator is similar to the magnetic head actuator according to the previous embodiment, but additionally includes an attachment 82 through which the magnetic head holder 40 is fastened to the support shaft 31 by the bolt 42. The attachment 82 has a central hole 83 defined therein through which the bolt 42 extends.

Furthermore, as shown in FIGS. 13 through 17, the magnetic head actuator has a hollow, substantially cylindrical yoke 84 which includes a land 85 disposed on the bottom 23. The land 85 has a pair of internally threaded holes 86, 87 defined therein for the insertion of the bolts 60, 61 and a pair of ledges 88, 89 on its opposite ends. The yoke 84 also includes a land 90 disposed on the open end 22. The land 90 has a pair of internally threaded holes 91, 92 defined therein for the insertion of the bolts 65, 66 and a pair of ledges 93, 94 on its opposite ends.

The ledges 88, 89 serve to engage and position the suspension support wing 44 therebetween, and the ledges 93, 94 also serve to engage and position the suspension support wing 45 therebetween. More specifically, the ledges 88, 89 have confronting parallel reference surfaces Y, Z (see FIG. 16), respectively, engaging respective opposite edges Y, Z (see FIG. 15) of the suspension support wing 44, and the land 85 has a rear reference surface X (see FIG. 17) for alignment with the edge X (see FIG. 15) of the proximal end of the suspension support wing 44. Similarly, the ledges 93, 94 have confronting reference surface Y, Z (see FIGS. 14 and 16), respectively, engaging respective opposite edges Y, Z (see FIG. 15) of the suspension support wing 44, and the land 90 has a rear reference surface X (see FIGS. 14 and 17) for alignment with the edge X (see FIG. 15) of the proximal end of the suspension support wing 45. The edges X and the reference surfaces X can be aligned with each other by a suitable reference plate held thereagainst. The edges X, Y, Z of the suspension support wings 44, 45 can therefore be positioned accurately with respect to the yoke 84 by alignment and engagement with the reference surfaces X, Y, Z of the yoke 84. Accordingly, the support shaft 31 is accurately supported, without being undesirably tilted, with respect to the yoke 84 by the suspension support wings 44, 45.

Figure 18:
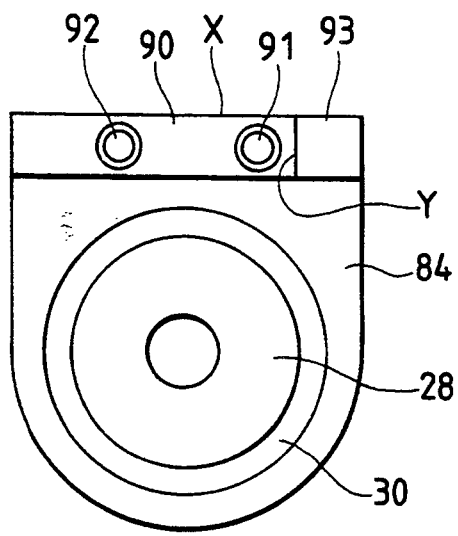
FIG. 18 is a plan view of a modified yoke.
Figure 19:
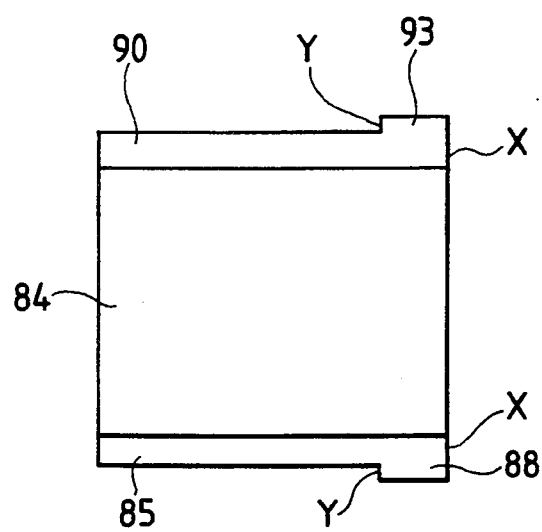
FIG. 19 is a front elevational view of the modified yoke shown in FIG. 18.

A modified yoke shown in FIGS. 18 and 19 differs from the yoke shown in FIGS. 12 through 17 in that it does not have the ledges 89, 94 and hence the reference surfaces z. The suspension support wings 44, 45 are therefore positioned by alignment with the reference surface X and engagement with the reference surfaces Y.

Figure 20:
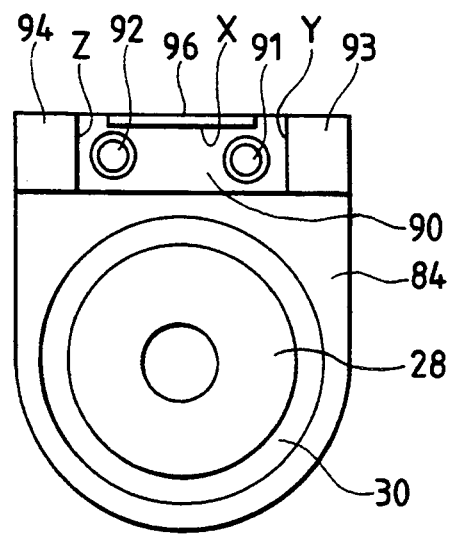
FIG. 20 is a plan view of another modified yoke.
Figure 21:
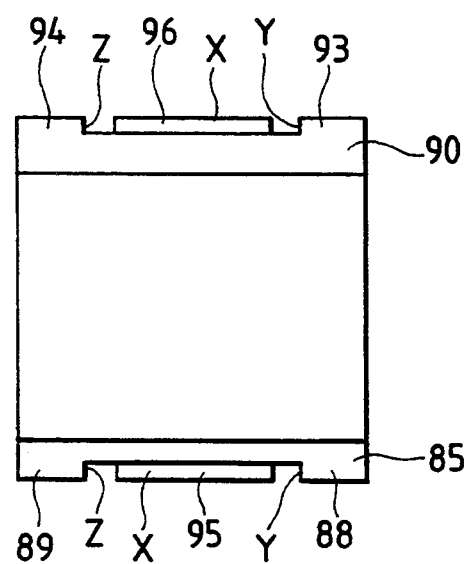
FIG. 21 is a front elevational view of the modified yoke shown in FIG. 20.

FIGS. 20 and 21 illustrate another modified yoke that is different from the yoke shown in FIGS. 12 through 17 in that the lands 85, 90 additionally have respective positioning ledges 95, 96 extending along rear edges thereof and disposed respectively between the ledges 88, 89 and between the ledges 93, 94. The ledges 95, 96 have front reference surfaces X, extending perpendicularly to the reference surfaces Y, Z, for engaging and positioning the the edges X (see FIG. 15) of the proximal ends of the suspension support wings 44, 45.

Figure 22:
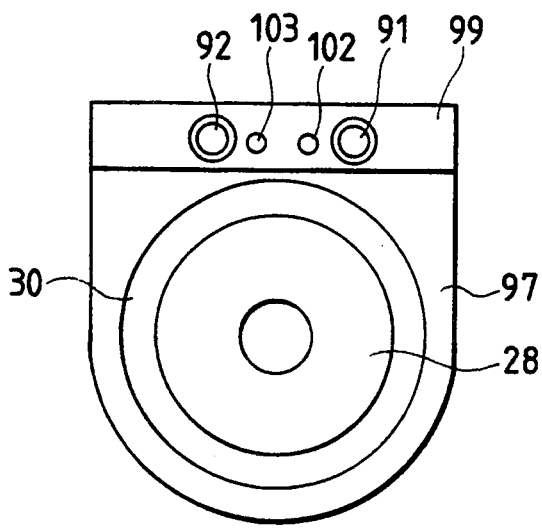
FIG. 22 is a plan view of still another modified yoke.
Figure 23:
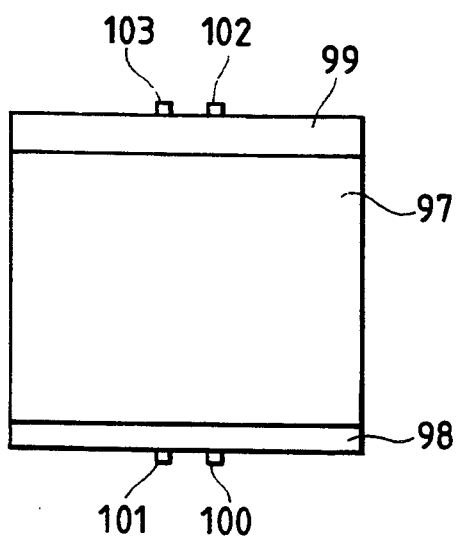
FIG. 23 is a front elevational view of the modified yoke shown in FIG. 22.
Figure 24:
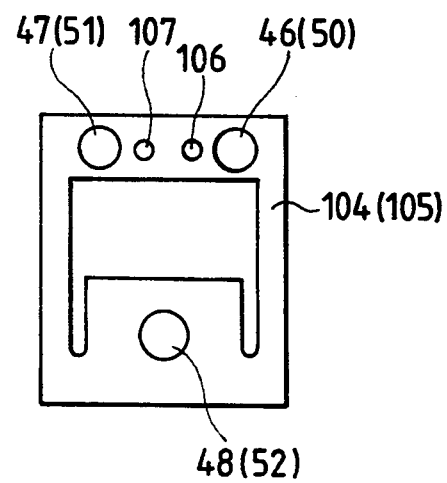
FIG. 24 is a plan view of a suspension support wing for use with the modified yoke shown in FIG. 22.
Figure 25:
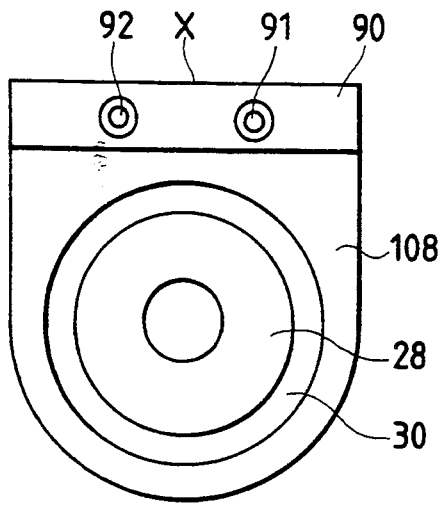
FIG. 25 is a plan view of a further modified yoke.
Figure 26:
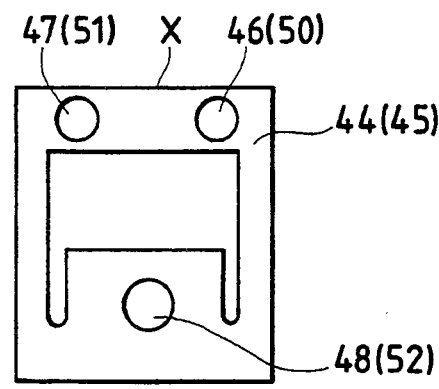
FIG. 26 is a plan view of a suspension support wing for use with the modified yoke shown in FIG. 25.
Figure 27:
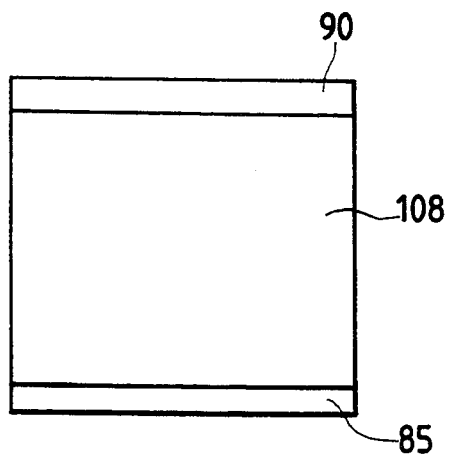
FIG. 27 is a front elevational view of the modified yoke shown in FIG. 25.
Figure 28:
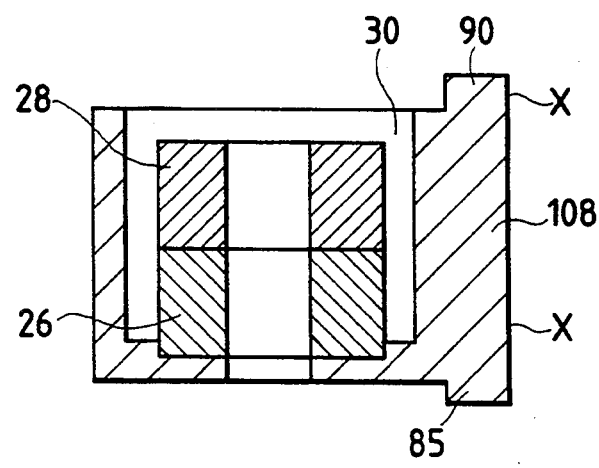
FIG. 28 is a cross-sectional view of the modified yoke shown in FIG. 25.

According to still another modification shown in FIGS. 22 through 24, a yoke 97 has a pair of lands 98, 99 on its opposite ends which have a pair of positioning pins 100, 101 and a pair of positioning pins 102, 103, respectively. The positioning pins 100, 101 are spaced from each other and located substantially centrally on the land 98, and the positioning pins 102, 103 are spaced from each other and located substantially centrally on the land 99. As shown in FIG. 24, each of suspension support wings 104, 105 to be attached to the respective lands 98, 99 have a pair of positioning holes 106, 107 defined in the proximal ends thereof respectively between the holes 46, 47 and between the holes 50, 51. The suspension support wings 104, 105 are accurately positioned with respect to the yoke 97 by the positioning pins 100, 101 and 102, 103 that are fitted respectively in the positioning holes 106, 107 in the suspension support wings 104, 105.

FIGS. 25 through 28 show a further modification in which a yoke 108 has no ledges and no positioning pins on its lands 56, 59, but the lands 56, 59 have rear reference surfaces X for alignment with the edges X (see FIG. 26) of the proximal ends of the suspension support wings 44, 45. The edges X and the reference surfaces X can be aligned with each other by a suitable reference plate held thereagainst, for thereby positioning the suspension support wings 44, 45 accurately with respect to the yoke 108.

Figure 29:
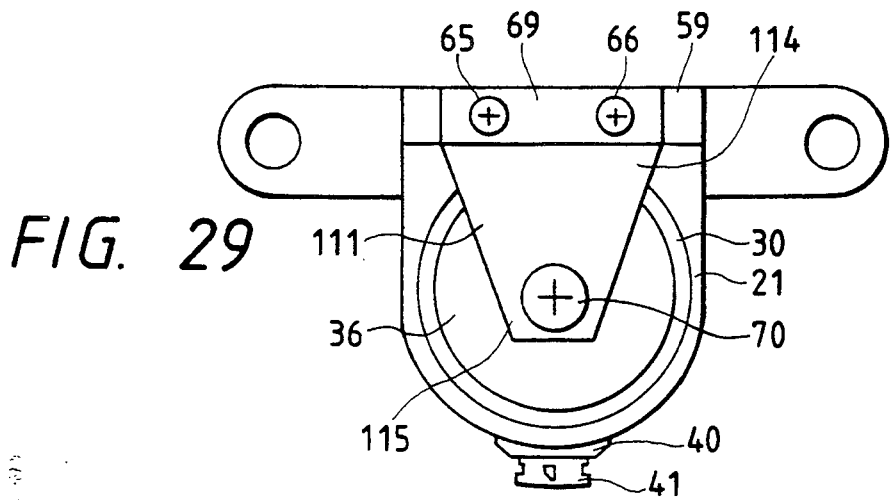
FIGS. 29, 30, and 31 are plan, front elevational, and bottom views of a yoke with suspension support wings according to still another embodiment of the present invention.
Figure 30:
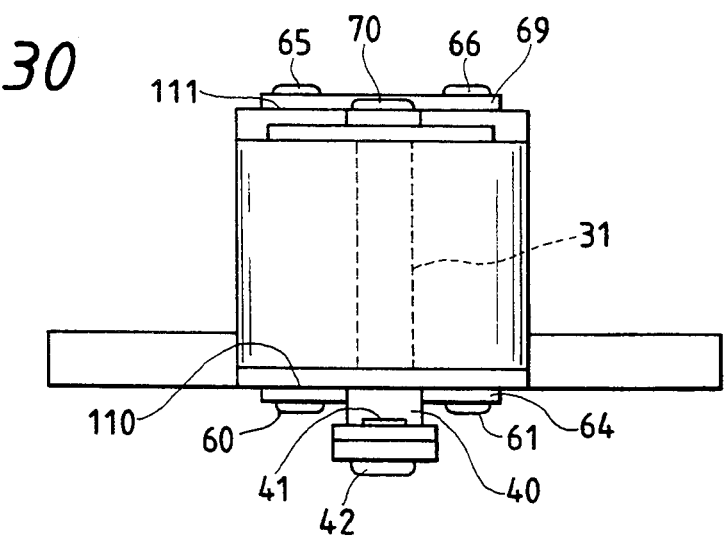
Figure 31:
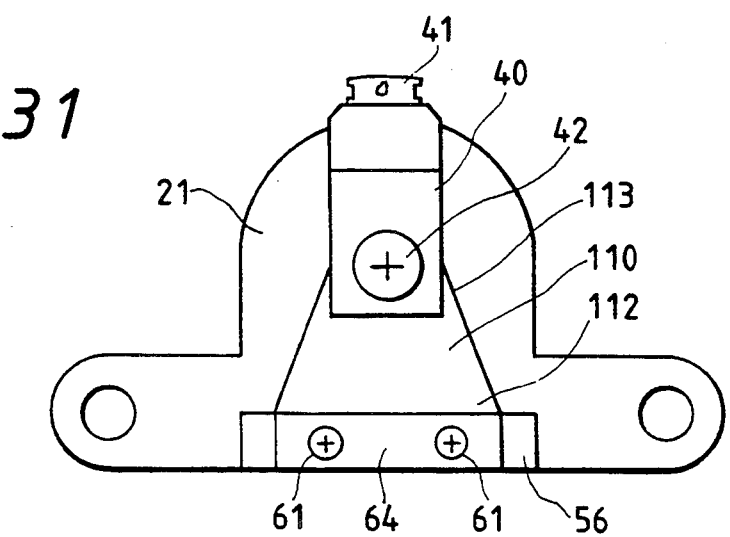

FIGS. 29 through 31 show a yoke with suspension support wings according to still another embodiment of the present invention.

As shown in FIGS. 29 and 31, suspension support wings 110, 111 mounted on the yoke 21 are of a trapezoidal shape. As shown in FIG. 31, the suspension support wing 110 has a wider end 112 fastened to the land 56 by the bolts 60, 61 and a shorter end 113 fastened to the support shaft 31 by the bolt 42. Similarly, as shown in FIG. 29, the suspension support wing 111 has a wider end 114 fastened to the land 59 by the bolts 65, 66 and a shorter end 115 fastened to the support shaft 31 by the bolt 42.

As shown in FIGS. 30 and 31, the shorter end 113 of the suspension support wing 110 is interposed between the support shaft 31 and the magnetic head holder 40.

Figure 32:
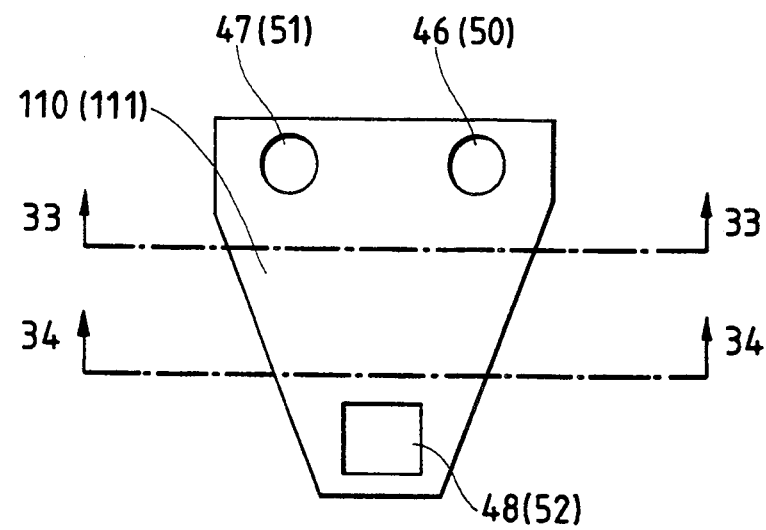
FIG. 32 is a plan view of the suspension support wings shown in FIGS. 29 through 31.
Figure 33:
FIG. 33 is a cross-sectional view taken along line 33–33 of FIG. 32.
Figure 34:
FIG. 34 is a cross-sectional view taken along line 34–34 of FIG. 32.

As shown in FIGS. 32, 33, and 34, each of the suspension support wings 110, 111 comprises a thin resilient plate which is linearly tapered from the wider end to the shorter end. The suspension support wings 110, 111 may however have curved tapered edges. The suspension support wings 110, 111 have holes 48, 52 defined in the shorter ends for the insertion of the respective bolts 42, 70. The suspension support wings 110, 111 are of high compliance, i.e., highly flexible in the direction parallel to the support shaft 31, but are of very low compliance, i.e., highly rigid in the direction normal to the support shaft 31, or parallel to the suspension support wings 110, 111. The movable mechanism supported by the suspension support wings 110, 111, which are of very low compliance in the direction parallel thereto, is prevented from vibration in a secondary resonant mode when the movable shaft 31 and the magnetic head 41 supported thereby are actuated. Inasmuch as the magnetic head 41 supported on the movable mechanism is free from such vibration, information signals recorded on and reproduced from the magnetic tape by the magnetic head 41 do not fluctuate with respect to time.

Figure 35:
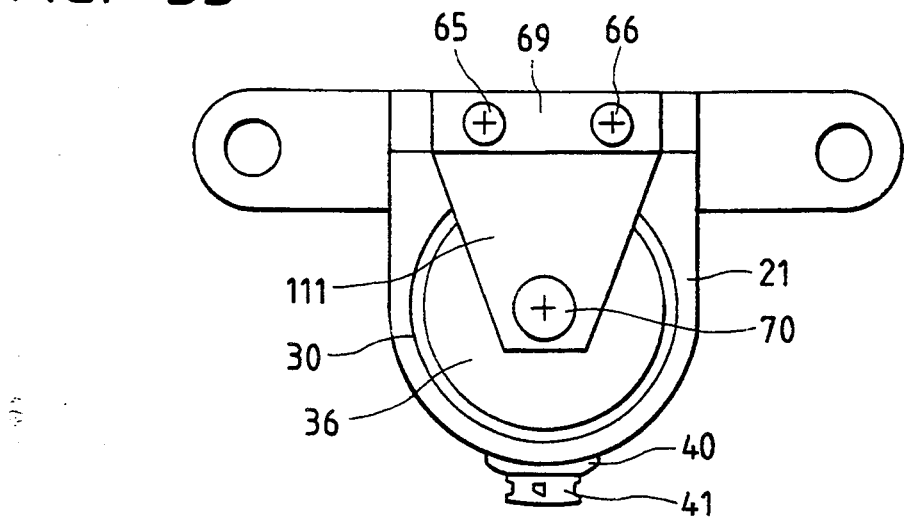
FIGS. 35, 36, and 37 are plan, front elevational, and bottom views of a modified assembly of a yoke and suspension support wings.
Figure 36:
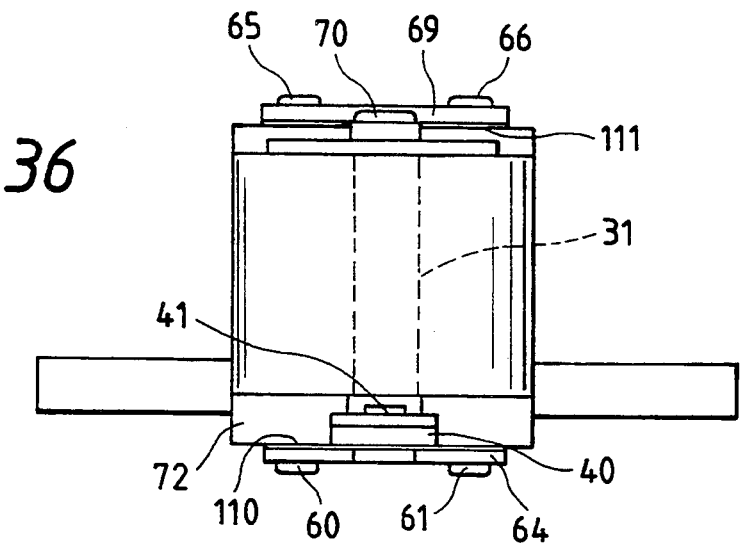
Figure 37:
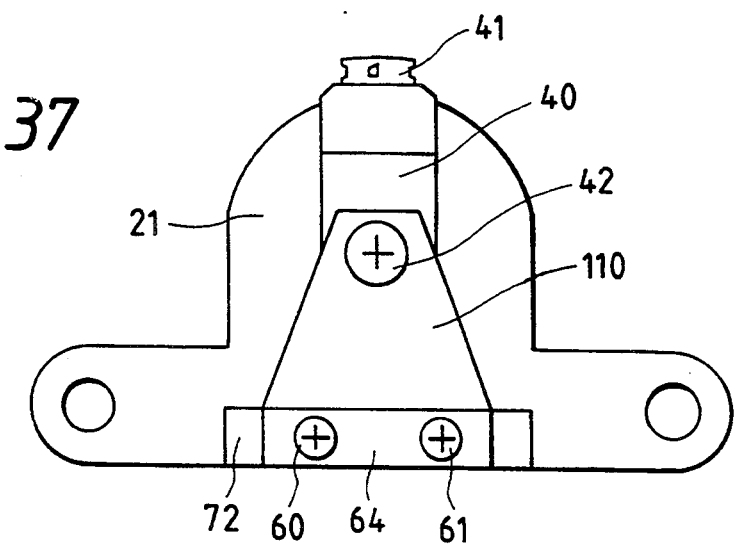

FIGS. 35 through 37 show a modified assembly of the yoke 21 and the suspension support wings 110, 111. As shown in FIGS. 36 and 37, the longer end 112 of the suspension support wing 110 is fastened to the higher land 72 of the yoke 21, and the magnetic head holder 40 is interposed between the support shaft 31 and the shorter end 113 of the suspension support wing 110.

Although certain preferred embodiments of the present invention have been shown and described in detail, it should be understood that various changes and modifications may be made therein without departing from the scope of the appended claims.

We claim as our invention:

1. An actuator for displacing a magnetic head, comprising:
    a hollow yoke having a closed end and an open end;
    magnetic means fixedly mounted in said hollow yoke for providing a magnetic circuit in combination with said hollow yoke, said magnetic circuit having an annular air gap;
    a support shaft axially movably extending through said hollow yoke and having opposite ends positioned outside of said closed and open ends, respectively, of said hollow yoke;
    a coil bobbin attached to the end of said support shaft which is positioned outside of said open end of said hollow yoke, said coil bobbin supporting a coil which is axially movably positioned in said air gap;
    a pair of parallel resilient suspension support wings mounted on said yoke and attached respectively to said opposite ends of said support shaft; and
    a magnetic head holder supporting a magnetic head thereon, said magnetic head bolder being mounted on the end of said support shaft near said closed end of said hollow yoke with said magnetic head holder and said magnetic head being positioned outside said closed end of said hollow yoke.

2. An actuator according to claim 1, wherein one of said suspension support wings is interposed between said magnetic head holder and said support shaft and an attachment is interposed between said magnetic head holder and said one of suspension support wings.

3. An actuator according to claim 1, wherein said magnetic head holder is interposed between one of said suspension support wings and said support shaft.

4. An actuator according to claim 3, wherein said magnetic head holder includes a first portion positioned on one side of said support shaft and supporting said magnetic head, and a second portion positioned on the other side of said support shaft, said first and second portions being of substantially the same weight as each other.

5. An actuator according to claim 4, wherein said support shaft, said coil bobbin, and said magnetic holder jointly serving as a movable mechanism, said movable mechanism having a center of gravity positioned on said support shaft substantially intermediate between said suspension support wings.

6. An actuator according to claim 1, wherein said coil bobbin is annular shaped and is engaged at one axial end thereof with a flange formed integrally with said support shaft, said flange having a stepped portion to be engaged with said one axial end of the coil bobbin.

7. An actuator according to claim 1, further including a flange integral with an axial end of the coil bobbin, said flange being joined to the end of said support shaft.

8. An actuator according to claim 1, further including a flange integral with the end of said support shaft, an axial end of the coil bobbin being joined to said flange.

9. An actuator according to claim 1, further including an attachment, said magnetic head holder being mounted on the end of said support shaft through said attachment.

10. An actuator according to claim 1, wherein said magnetic means comprises a permanent magnet fixedly mounted in said hollow yoke and a central pole joined to said permanent magnet, said permanent magnet and said central pole being positioned in said coil.

11. An actuator according to claim 1, wherein said hollow yoke has a pair of lands disposed on said closed and open ends, respectively, thereof, said suspension support wings having ends fastened to said lands, respectively, remotely from said support shaft.

12. An actuator according to claim 11, wherein each of said lands has at least one reference surface engaging a corresponding edge of one of said suspension support wings, thereby positioning the suspension support wings with respect to said hollow yoke.

13. An actuator according to claim 12, wherein each of said lands has two parallel reference surfaces engaging corresponding edges of one of said suspension support wings.

14. An actuator according to claim 12, wherein each of said lands has a second reference surface extending perpendicularly to said at least one reference surface, said second reference surface engaging a corresponding edge of one of said suspension support wings.

15. An actuator according to claim 11, wherein each of said lands has at least one positioning pin, each of said suspension support wings having at least one positioning hole receiving said positioning pin therein.

16. An actuator according to claim 1, wherein each of said suspension support wings comprises a thin resilient plate of a rectangular shape, said thin resilient plate being provided with a substantially U-shaped hole therein.

17. An actuator according to claim 1, wherein each of said suspension support wings comprises a thin resilient plate of a trapezoidal shape, and said thin resilient plate has a constant thickness.

18. An actuator according to claim 17, wherein each of said suspension support wings has a wider end joined to said hollow yoke and a shorter end joined to said support shaft.

* * * * *